(12) United States Patent
Lee et al.

(10) Patent No.: US 8,361,541 B2
(45) Date of Patent: Jan. 29, 2013

(54) FABRICATION OF MAGNETORESISTIVE SENSORS AND ELECTRONIC LAPPING GUIDES

(75) Inventors: Edward Hin Pong Lee, San Jose, CA (US); David John Seagle, Morgan Hill, CA (US)

(73) Assignee: HGST Netherlands B.V., Luna Arena, Amsterdam (NL)

( * ) Notice: Subject to any disclaimer, the term of this patent is extended or adjusted under 35 U.S.C. 154(b) by 250 days.

(21) Appl. No.: 12/462,104

(22) Filed: Jul. 28, 2009

(65) Prior Publication Data

US 2011/0027618 A1    Feb. 3, 2011

(51) Int. Cl.
*G11B 5/33*    (2006.01)
*G11B 5/127*   (2006.01)

(52) U.S. Cl. ........ 427/131; 427/127; 427/128; 360/110; 360/321; 428/800; 428/811

(58) Field of Classification Search .................. 427/131; 428/800, 811; 360/110
See application file for complete search history.

(56) References Cited

U.S. PATENT DOCUMENTS

| | | | | |
|---|---|---|---|---|
| 5,678,086 A | * | 10/1997 | Gandola et al. | 396/319 |
| 6,609,948 B1 | * | 8/2003 | Fontana et al. | 451/5 |
| 6,657,825 B2 | | 12/2003 | Ho et al. | |
| 6,665,152 B2 | | 12/2003 | Nemoto | |
| 7,057,864 B2 | | 6/2006 | Gill | |
| 7,068,475 B2 | | 6/2006 | Kondo et al. | |
| 7,092,218 B2 | | 8/2006 | Hasegawa et al. | |
| 7,170,721 B2 | | 1/2007 | Wu | |
| 7,206,172 B2 | | 4/2007 | Ding et al. | |
| 7,244,169 B2 | | 7/2007 | Cyrille et al. | |
| 7,245,459 B2 | | 7/2007 | Cyrille et al. | |
| 7,290,325 B2 | | 11/2007 | Wu | |
| 2006/0034021 A1 | * | 2/2006 | Wu | 360/316 |
| 2008/0013219 A1 | | 1/2008 | Wu | |
| 2008/0273275 A1 | * | 11/2008 | Lille | 360/319 |

FOREIGN PATENT DOCUMENTS

| | | |
|---|---|---|
| JP | 2-113412 | 4/1990 |
| JP | 2301010 | 12/1990 |
| JP | 4305811 | 10/1992 |
| JP | 2001084522 | 3/2001 |
| JP | 2003142756 | 5/2003 |

\* cited by examiner

*Primary Examiner* — Timothy Meeks
*Assistant Examiner* — Mandy Louie
(74) *Attorney, Agent, or Firm* — Mintz Levin Cohn Ferris Glovsky and Popeo, P.C.

(57) ABSTRACT

The subject matter disclosed herein provides methods for manufacturing an electronic lapping guide and a magnetic read head assembly. The magnetoresistive head assembly includes a sensing element that has a front edge and a front flux guide that has a back edge, such that the sensing element front edge and the front flux guide back edge share a common interface that defines an interface plane normal to the surface of a wafer substrate. The electronic lapping guide comprises a conductive material adapted to attach to two electrical leads for measuring a resistance through the conductive material. The conductive material may include a conductive material back edge aligned with the interface plane. The resistance of the conductive material may be inversely proportional to a conductive material length normal to the interface plane.

10 Claims, 7 Drawing Sheets

FABRICATION OF MAGNETORESISTIVE SENSORS AND ELECTRONIC LAPPING GUIDES

FIELD

The present disclosure generally relates to fabrication of magnetoresistive heads and electronic lapping guides.

BACKGROUND

Magnetoresistive (MR) devices undergo electrical resistance changes when an external magnetic field is applied. Such devices have numerous applications, including as the reader portion of a magnetic read head in a magnetic data storage and retrieval system, for example a computer disk drive. One type of reader used in disk drives is a tunneling magnetoresistive (TMR) sensing element, which typically includes a sensing element made of a series of layers. For example, a sensing element may include a sensor material layer sandwiched between a pinned magnetic layer and a free magnetic layer. The sensing element may be disposed between first and second nonmagnetic gap layers. The first and second gap layers can be located between ferromagnetic first and second shield layers while first and second lead layers are connected to the sensing element for conducting a sense current. When the sensing element is subjected to positive and negative signal fields from tracks on a rotating magnetic disk in a disk drive, the resistance of the read sensor changes. These resistance changes cause potential changes in the sense current circuit, which are processed as playback signals by processing circuitry.

A typical magnetic read head for use with a disk drive has an exterior head surface which faces the rotating magnetic disk and is supported on swirling air from the rotating disk which is referred to as an air bearing. For this reason, the exterior head surface is referred to as an air bearing surface. The sensing element has a back edge which is recessed in the read head opposite the air bearing surface. The back edge is precisely located by photolithography processing.

During construction, the air bearing surface is precisely defined so that the sensing element has a precise stripe height which is the distance between the air bearing surface and the back edge. This is accomplished by lapping the wafer substrate on which the magnetic read head is constructed. To achieve precise and accurate control of the depth to which the sensing element is lapped, an electronic lapping guide is typically included on the wafer substrate with the sensing element during manufacture. The wafer substrate is then diced into rows and then lapped until the air bearing surface has been precisely formed. The electrical resistance of the electronic lapping guide is inversely proportional to the height of the sensor. Thus, monitoring of the electronic lapping guide resistance during lapping permits very fine tuned control of the stripe height of the sensing element. For example, the lapping process can be controlled to cease when the electronic lapping guide resistance reaches a calculated value associated with a desired stripe height of the sensing element.

The magnetic read head can also include a flux guide formed of a soft magnetic material which guides leakage fluxes from the disc medium towards the sensing element. The flux guide also enables the sensing element to be formed away from the air bearing surface, thereby preventing a short circuit from occurring when the tip of the element becomes exposed to the air bearing surface.

SUMMARY

The subject matter disclosed herein provides methods for manufacturing magnetoresistive heads and electronic lapping guides on a surface of a wafer substrate.

In one aspect, a sensing structure and a front flux guide may be fabricated on a surface of a wafer substrate. The sensing structure may include a sensing element that has a front edge and a front flux guide having a back edge, configured such that the front edge of the sensing element and the back edge of the front flux guide share a common interface that defines an interface plane normal to the surface of the wafer substrate. The front flux guide may have a front flux guide length that is normal to the interface plane.

In another aspect, methods include fabricating an electronic lapping guide at an electronic lapping guide site positioned on the surface of the wafer substrate. The electronic lapping guide comprises a conductive material adapted to attach to two electrical leads for measuring a resistance through the conductive material. The conductive material may include a conductive material back edge aligned with the interface plane. The resistance of the conductive material may be inversely proportional to a conductive material length normal to the interface plane.

In another aspect, provided is an article of manufacture that includes a wafer substrate having a surface in which a sensing structure is disposed. The sensing structure comprises a sensing element having a front edge. Included on the wafer substrate is a front flux guide that comprises a front flux guide back edge. The front edge of the sensing element and the back edge of the front flux guide share a common interface that defines an interface plane normal to the surface of the wafer substrate. The front flux guide may have a front flux guide length that is normal to the interface plane.

In another aspect, the article of manufacture may include an electronic lapping guide disposed at an electronic lapping guide site positioned on the surface of the wafer substrate. The electronic lapping guide comprises a conductive material adapted to attach to two electrical leads for measuring a resistance through the conductive material. The conductive material may comprise a conductive material back edge that is aligned with the interface plane. The resistance of the conductive material may be inversely proportional to a conductive material length normal to the interface plane.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, the manufacturing efficiency may be increased because the electronic lapping guide and the front flux guide may be formed from the same material. Thus, eliminating the need for the additional electronic lapping guide material layer deposition step. In another example, during the manufacturing process, the back edge of the electronic lapping guide may be formed in the same photo and subtractive processes as the back edge of the front flux guide, thereby enabling the electronic lapping guide to align with a front edge of the sensing element on the wafer substrate rather than the back edge as in typical structures. Thus, shorting occurrences may be reduced because the front edge of the sensing element is aligned to the back edge of the electronic lapping guide, thereby reducing the likelihood of the sensing element to be overly lapped during the lapping process. In turn, this increases the accuracy when defining the air bearing surface.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed in the detailed description and drawings.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Similar reference numerals in the drawings are intended to denote similar structures or other features of the described subject matter.

DETAILED DESCRIPTION

Exemplary methods for manufacturing magnetoresistive heads and electronic lapping guides on a surface of a wafer substrate are provided as well as articles of manufacture. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention.

Figure 1:
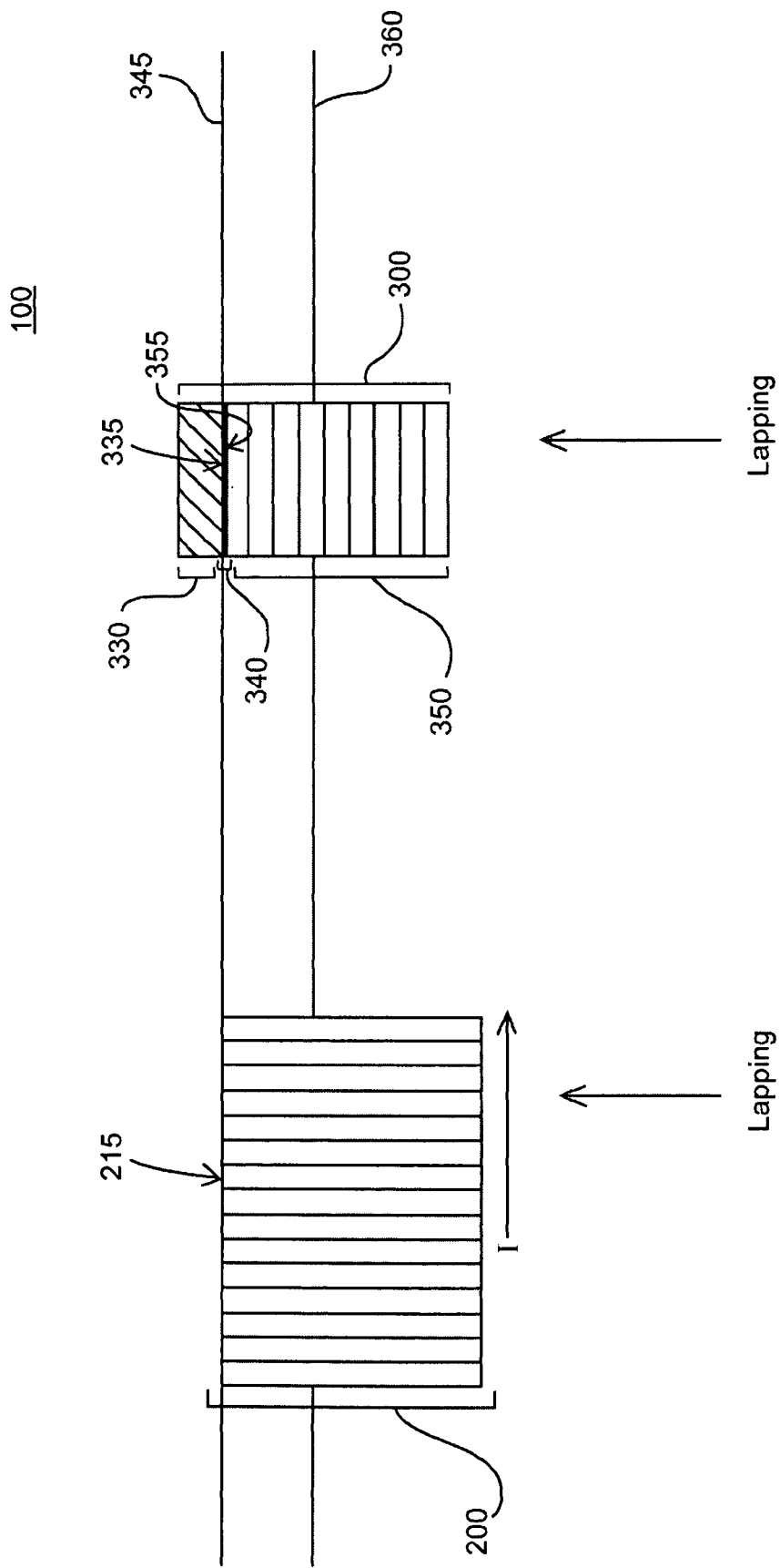
FIG. 1 is a diagram showing a magnetoresistive head assembly and an electronic lapping guide on a surface of a wafer substrate.

FIG. 1 shows a wafer substrate 100 with an electronic lapping guide 200 and a magnetoresistive head assembly 300 assembled on the top surface of the wafer substrate 100. The magnetoresistive head assembly 300 includes a sensing element 330 and a front flux guide 350. The sensing element 330 may include one or more layers of a sensing material (not shown). When subjected to a magnetic field, the change in resistance of the sensing element 330 may be measured by passing a sense current through the sensing element 330 and then measuring the change in voltage across the element 330. The resulting signal is used by the magnetoresistive read head assembly 300 to read information.

The front flux guide 350 may be formed of a soft magnetic material and guides magnetic leakage flux from a recording medium to the sensing element 330.

As shown in FIG. 1, the front edge 335 of the sensing element 330 and the back edge 355 of the front flux guide 350 share a common interface, referred to herein as an element-flux guide interface 340, such that the sensing element front edge 335 and the front flux guide back edge 355 define an interface plane 345 normal to the surface of the wafer substrate 100. The front flux guide 350 has a front flux guide length that is normal to the interface plane 345.

The electronic lapping guide 200, as can be seen in FIG. 1, may comprise a conductive material adapted to attach to two electrical leads for measuring a resistance through the conductive material. The conductive material may include a conductive material back edge 215 aligned with the interface plane 345. The resistance of the conductive material as measured between the two electrical leads may be inversely proportional to a conductive material length normal to the interface plane. Although the leads are not shown in FIG. 1, the current (I) of the electronic lapping guide flows parallel to the major thin film surfaces of the electronic lapping guide 200.

In optional variations, the electronic lapping guide 200 can be positioned such that is it not directly adjacent to a magnetoresistive head assembly 300 but may instead be positioned adjacent to another component, such as for example a write head. In still another optional variation, the electronic lapping guide 200 can be positioned anywhere on the same wafer substrate 100 as the magnetoresistive head assembly 300. In yet another optional variation, the wafer substrate 100 may include a plurality of electronic lapping guides positioned anywhere on the same wafer substrate 100 as the magnetoresistive head assembly 300. The electronic lapping guide 200 is used to predict the height of a magnetoresistive transducer, also referred to as the stripe height. The predicted stripe height may be fed by the electronic lapping guide to a bar lapping machine. In one illustrative example, during the fabrication of a magnetoresistive head, a lapping system determines when a designated stripe height has been achieved by measuring the resistance of the conductive material in one or more electronic lapping guides 200. Therefore, an accurate air bearing surface 360 may be achieved by monitoring the resistance of the conductive material of an electronic lapping guide 200.

Photolithography techniques may be utilized to align the back edge 215 of the electronic lapping guide 200 to the interface plane 345 normal to the surface of the wafer substrate 100. During the manufacturing process, the back edge of the electronic lapping guide 215 may be formed in the same photo and subtractive processes as the back edge 355 of the front flux guide. For example, the back edge 215 of the electronic lapping guide 200 may align through the same mask to the back edge 355 of the front flux guide 300. In turn, during this step, the back edge 215 of the electronic lapping guide 200 is also aligned with a front edge 335 of the sensing element 330 on the wafer substrate 100 rather than the back edge of the sensing element 330 as in typical structures.

Electronic lapping guides 200 and magnetoresistive head assemblies 300 may be manufactured utilizing any of a number of suitable wafer/semiconductor processing techniques. For example, an electronic lapping guide 200 and magnetoresistive head assembly 300, such as shown in FIG. 1, may be fabricated in clean rooms using vacuum or physical vapor deposition methods (such as RF or DC magnetron sputtering, RF or DC diode sputtering, RF or DC triode sputtering) and ion beam deposition, batch photolithographic methods (such as photoresist masking, coating, and developing), chemical assisted and reactive ion-beam etching, photoresist stripping and etching that allow for very small head and element dimensions and precise positioning and alignment of multiple elements. The slots or separation of the magnetoresistive heads 300 can be achieved using laser trimming, precision grinding, or other machining techniques.

Each magnetoresistive head assembly 300 and electronic lapping guide 200 may be fabricated by encapsulating layers of materials within two or more substrate materials on a wafer substrate 100 followed by dicing of the wafer substrate 100 along a dicing plane normal to the surface and then lapping or fine polishing the dicing plane to achieve a desired media contact contour and surface. Alternatively, each magnetoresistive read head assembly 300 and electronic lapping guide 200 may be fabricated of several segments or portions that are then epoxy-bonded together to create the elongated islands. The media contact surface may be coated with a corrosion or wear resistant thin layer to protect the elements.

The number of thin film layers utilized in the sensing element 330 and in fabricating the electronic lapping guide 200 as well as the make-up of each layer may be varied depending on the particular application and design considerations. In certain aspects, the sensing element 330 may be a current-in-plane (CIP) sensing element or a current-perpendicular-to-plane (CPP) sensing element. In current-in-plane (CIP) configurations, a sense current passes longitudinally along the plane directions of the layers, entering at one lateral edge of the sensor and exiting at the other. In current-perpendicular-to-plane (CPP) configurations, the current passes vertically through the planes, entering at the top and exiting through the bottom.

For example, the sensing element 330 may be fabricated with insulating layers (such as alumina) and top and bottom layers or magnetic poles of nickel, nickel cobalt alloys, or nickel iron alloys, such as in thin film heads. Shield layers fabricated using at least one of cobalt, nickel, and iron may also be useful for fabricating sensing elements. The base substrate upon which the sensing elements 330 are built may be ferrite, aluminum oxide titanium carbide (AlTiC) or other materials. The specific materials or fabrication processes use to manufacture magnetoresistive heads 300 and electronic lapping guides 200 according to the currently disclosed subject matter are not limited to any specific materials or fabrication processes.

The electronic lapping guide 200 may be formed from the same material as the front flux guide 350. This may increase the manufacturing efficiency because the electronic lapping guide 200 and the front flux guide 350 may be formed from the same material, thus eliminating the need for the additional electronic lapping guide material layer deposition step.

Figure 2:
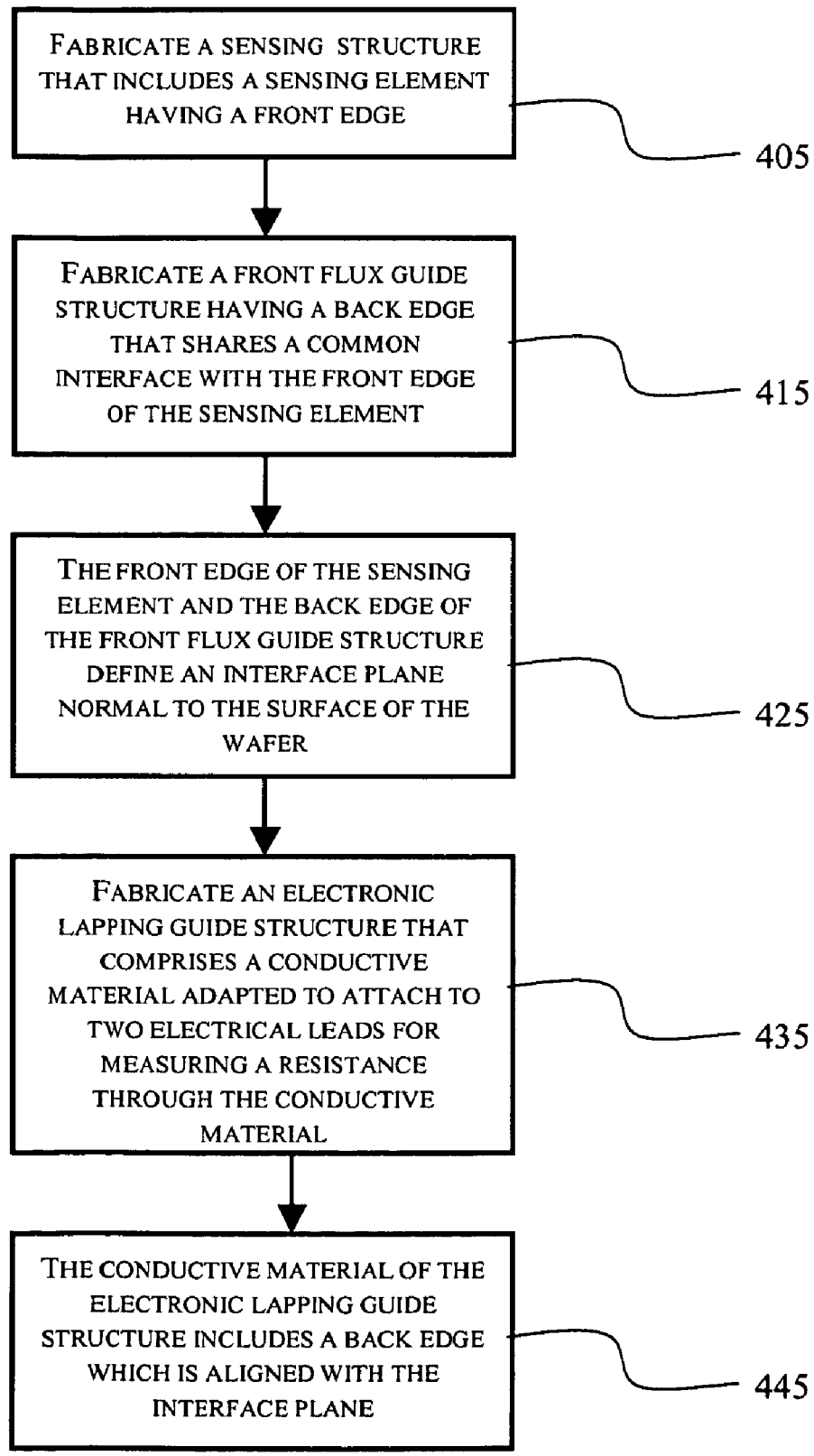
FIG. 2 is a diagram showing the process flow for manufacturing a sensing element of a magnetoresistive head assembly and an electronic lapping guide.
Figure 3A:
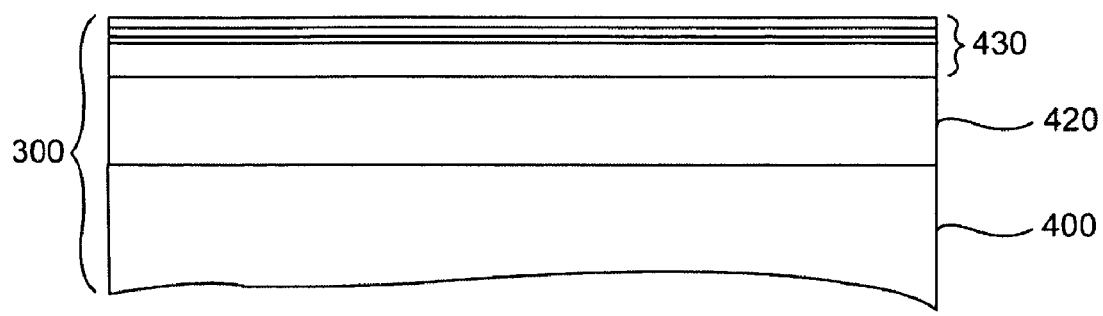
FIGS. 3A and 3B depict a cross-section view of a fabrication step for fabricating a sensing element of a magnetoresistive head assembly and an electronic lapping guide.
Figure 3B:
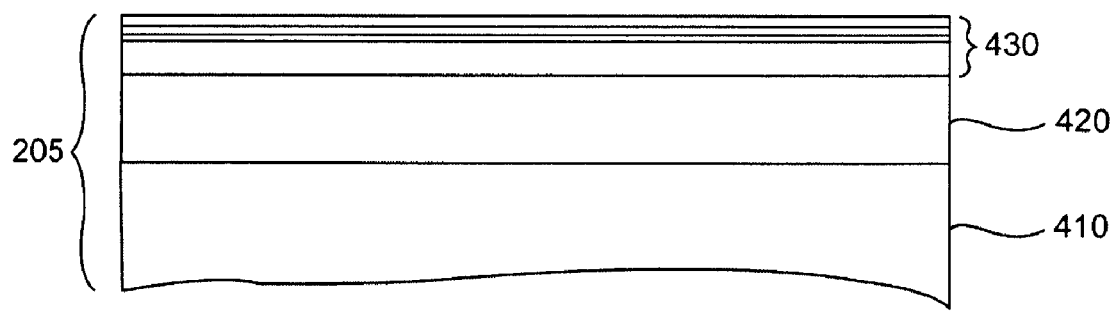
Figure 5A:
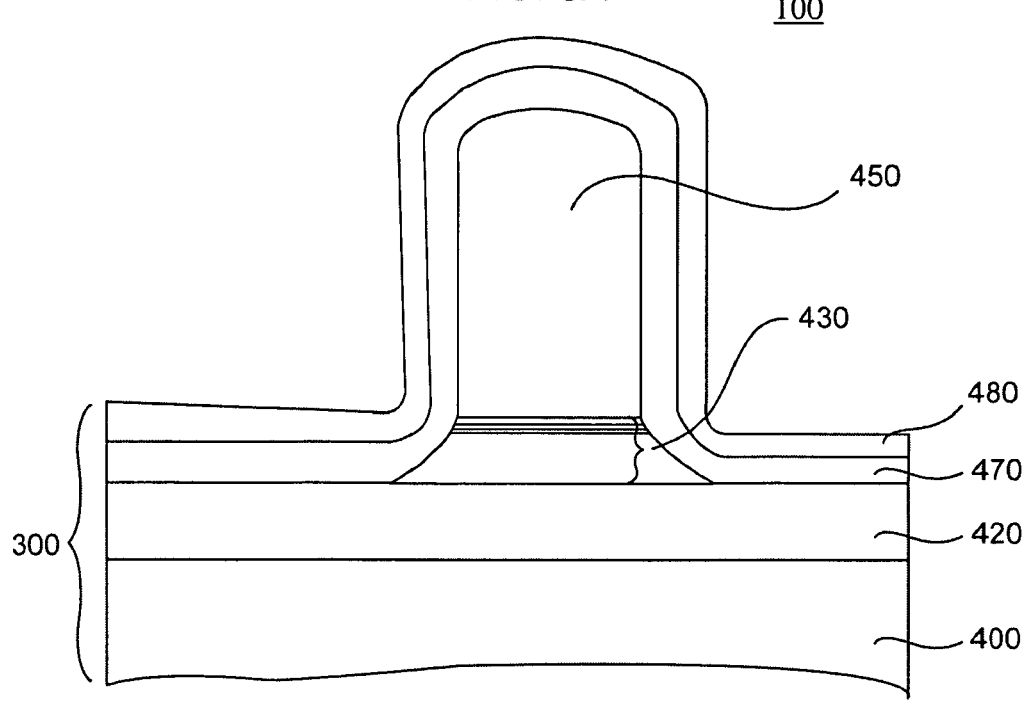
FIGS. 5A and 5B depict a cross-section view of a fabrication step for fabricating a sensing element of a magnetoresistive head assembly and an electronic lapping guide.
Figure 5B:
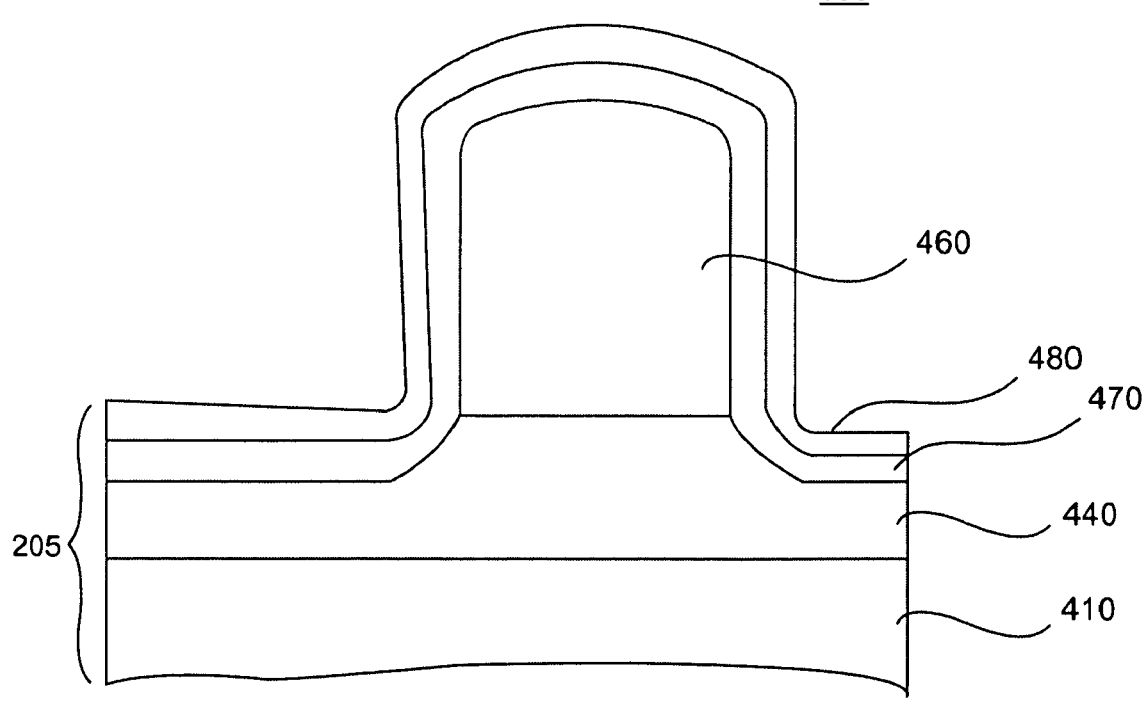
Figure 6A:
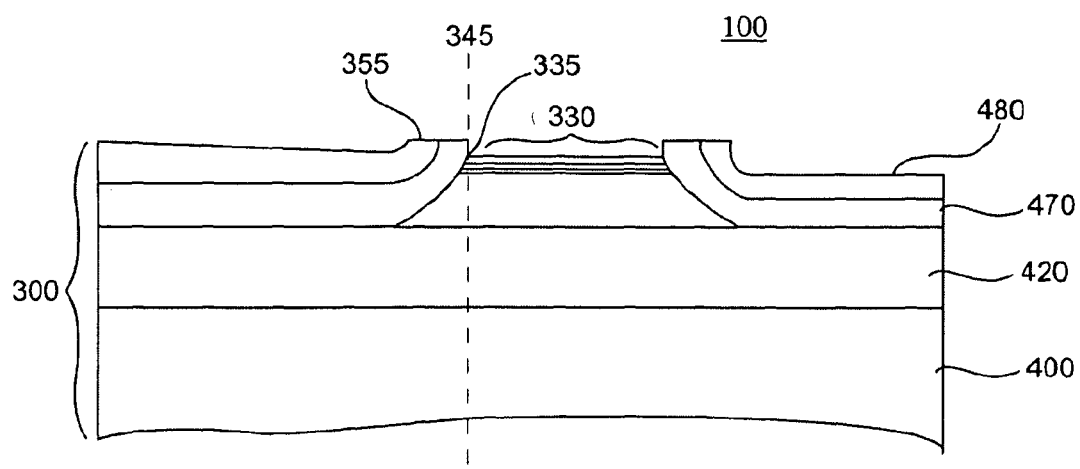
FIGS. 6A and 6B depict a cross-section view of a fabrication step for fabricating a sensing element of a magnetoresistive head assembly and an electronic lapping guide.

FIG. 2 in conjunction with FIGS. 3-7 show an exemplary process for manufacturing a magnetoresistive head assembly 300 and an electronic lapping guide 200 as shown in FIG. 6. At 405, a magnetoresistive head and electronic lapping guide are fabricated on a wafer substrate 100. As shown in FIG. 3A, in fabricating the magnetoresistive head assembly 300, a first shield layer 400 is deposited on a wafer substrate 100 which serves as the base. The first shield layer may be formed of a soft ferromagnetic material. For example, the first shield layer may be formed of nickel, nickel cobalt alloys, or nickel iron alloys, and the like. As shown in FIG. 3B, when fabricating the electronic lapping guide 200, a base alumina layer is first deposited at a different position site on the wafer substrate 100. This site may be referred to as the electronic lapping guide site 205. As further described below, a series of layers will be deposited at the electronic lapping guide site 205 upon which the electronic lapping guide 200 will ultimately be fabricated.

A first metal gap layer 420 is next deposited on the entire wafer substrate 100, thereby depositing a metal gap layer 420 on the first shield layer 400 of the magnetoresistive head assembly 300 and on the alumina layer 410 at the electronic lapping guide site 205. In certain aspects, the first metal gap layer 420 may be an electrically conducting and mechanically hard material. For example, the first metal gap layer 420 may be tantalum, chromium, rhodium, or the like.

A sensor material 430 may next be deposited on the wafer substrate 100, thereby a sensor material layer 430 is deposited on the first metal gap layer 420 of the magnetoresistive head assembly 300 and on the first metal gap layer 420 at the electronic lapping guide site 205. The sensor material layer 430 may also be referred to as a sensing structure. The sensing structure 430 may optionally include a series of one or more layers.

In certain aspects, the sensing element 330 may be a current-in-plane (CIP) sensing element or a current-perpendicular-to-plane (CPP) sensing element. For example, the sensing structure 430 may be a spin valve (SV) sensor which includes a nonmagnetic conducting spacer layer located between a ferromagnetic pinned layer and a ferromagnetic free layer. The pinned layer is exchange coupled to an antiferromagnetic pinning layer which pins a magnetic moment of the pinned layer perpendicular to the air bearing surface, such as into the read head. The free layer has a magnetic moment which is parallel to the air bearing surface and may be directed from left to right. A cap layer is located on the free layer for protecting it from subsequent processing steps. Exemplary materials of the layers are iridium manganese for the pinning layer, cobalt for the pinned layer, copper for the spacer layer, nickel iron for the free layer and tantalum for the cap layer. When signal fields rotate the magnetic moment of the free layer, the resistance of the spin valve sensor changes to the sense current, which in turn, causes a change in potential which is processed as a playback signal by a processing circuit.

In another example, the sensing structure 430 may be a tunnel junction read sensor, e.g., a TMR sensor, which includes a nonmagnetic, insulating tunneling or barrier layer located between a free layer and a pinned layer. The free layer may include first and second films. The pinned layer may be exchange coupled to an antiferromagnetic layer which pins a magnetic moment of the pinned layer perpendicular to the air bearing surface, such as into the read head. The free layer has a magnetic moment which may be oriented parallel to the air bearing surface and may be directed from left to right. Located on top of the film are capping layers. Exemplary materials for the layers are iridium manganese for the pinning layer, aluminum oxide for the tunneling layer, cobalt for the film, nickel iron for the film, tantalum and copper for the capping layers. When a signal field rotates the magnetic moment, resistance changes may be processed as playback signals by processing circuitry.

Figure 4A:
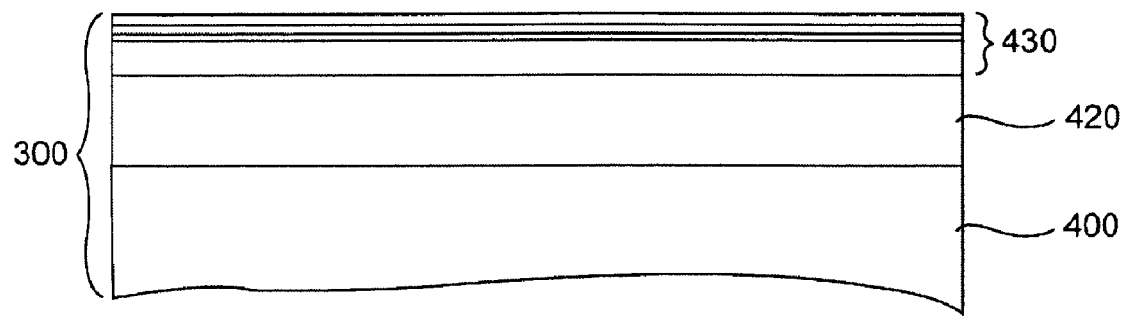
FIGS. 4A and 4B depict a cross-section view of a fabrication step for fabricating a sensing element of a magnetoresistive head assembly and an electronic lapping guide.
Figure 4B:
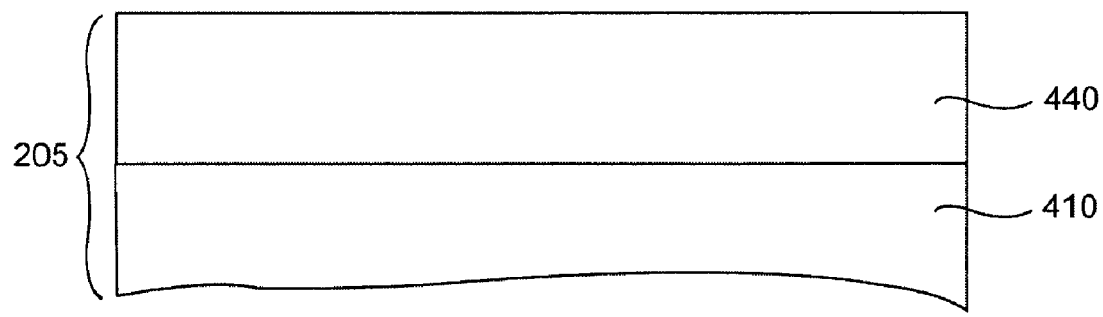

In the next step, the first metal gap layer 420 and the sensing structure 430 are protected on the magnetoresistive head assembly 300 while the first metal gap layer 420 and sensing structure 430 are removed from the electronic lapping guide site 205 by ion milling. As shown in FIG. 4B, an alumina layer 440 may next be deposited at the electronic lapping guide site 205 which brings the layers at the alumina site 205 to the same height as the magnetoresistive head assembly 300.

At 415, photolithography and ion milling methods are employed to define the sensing element 330 of the sensing structure 430 of the magnetoresistive head assembly 300. A bilayer resist may be spun on the entire wafer substrate 100 and light may be exposed through a mask 450 on the sensing structure 430 of the magnetoresistive head assembly 300 and on a mask 460 on the alumina layer 440 at the electronic lapping guide site 205. In this example, the resist may be a positive resist in which the light-exposed portions may be removed. A positive resist is a type of photoresist in which the portion of the photoresist that is exposed to light becomes soluble to the photoresist developer and the portion of the photoresist that is unexposed remains insoluble to the photoresist developer. In certain instances, a negative resist may be used instead of a positive resist. A negative resist is a type of photoresist in which the portion of the photoresist that is exposed to light becomes relatively insoluble to the photoresist developer. The unexposed portion of the photoresist is dissolved by the photoresist developer. The remaining photoresist is subjected to a developer to remove the light-exposed portions. In this step, the stripe on the sensing element 330 may be defined.

At 425, a layer of alumina 470 is deposited over the entire wafer substrate 100 as shown in FIGS. 5A and 5B. A flux guide material 480 is then deposited over the entire wafer substrate 100. The flux guide material may be a soft magnetic material such as cobalt iron alloy, nickel iron alloy, cobalt iron nickel alloy, cobalt, cobalt niobium zirconium, iron zirconium oxide alloy or the like. In certain aspects, the flux guide material may be mechanically hard. In certain aspects, the flux guide material may be nitrogenated. As such, an alumina layer 470 and flux guide material layer 480 is deposited on the magnetoresistive head assembly 300 and at the electronic lapping guide site 205 with the mask 450, 460 still present. During the fabrication step at 435, the back edge 215 of the electronic lapping guide 200 is aligned through the same mask to the back edge 355 of the front flux guide 350.

A liftoff process exposes the defined sensing element 330 and forms a front flux guide 350. In one example, a CMP liftoff process may be used. The front edge 335 of the sensing element 330 and the back edge 355 of the front flux guide 350 define an interface plane 345 normal to the surface of the wafer substrate 100. After the liftoff process, the electronic lapping guide 200 is also formed and includes a back edge 215 that is aligned with the interface plane 345.

Shorting occurrences may be reduced because the front edge 335 of the sensing element 330 is aligned to the back edge 215 of the electronic lapping guide 200. This reduces the likelihood of the sensing element 330 being overly lapped during the lapping process because the back edge 215 of the electronic lapping guide 200 is aligned to the front edge 335 of the sensing element 330. In turn, this increases the accuracy when defining the air bearing surface 360.

The electronic lapping guide 200 is now formed from the same material as the front flux guide 350, thereby eliminating the need for an additional electronic lapping guide material layer deposition step. In turn, this increases the manufacturing efficiency.

Figure 6B:
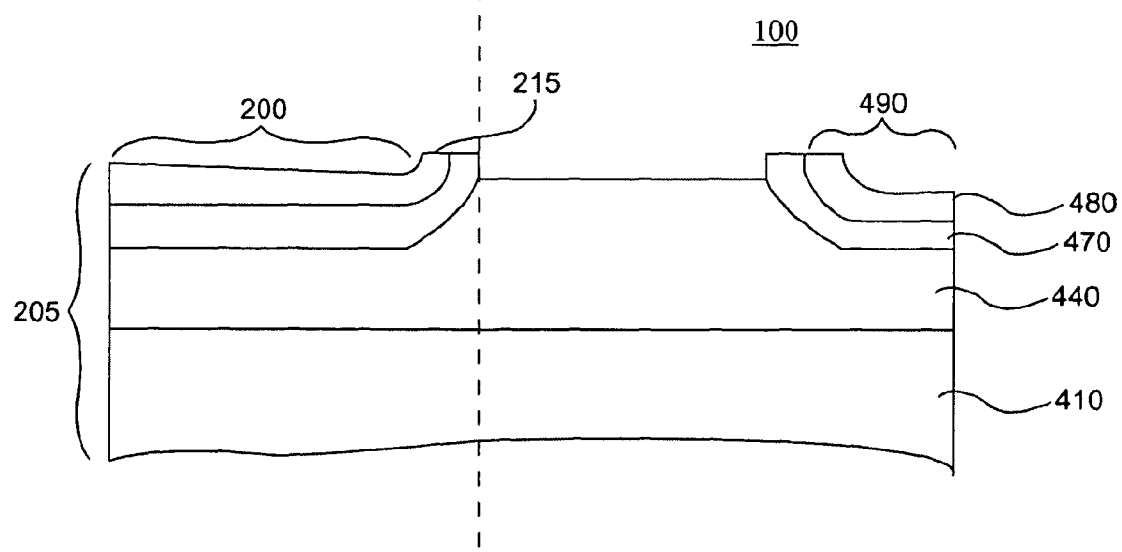

As shown in FIG. 6B, at the electronic lapping guide site 205, there is a portion of the flux guide material 490 which needs to be removed in order to prevent shorting during the lapping process. The flux guide material 490 may be removed either by chemical or milling processes. Referring back to FIGS. 5A and 5B, the mask 460 at the electronic lapping guide site 205 may be wider than the mask 450 used to define the sensing element 330. As such, the wider mask 460 creates a safe distance between the back edge 215 of the electronic lapping guide 200 and the flux guide material 490 which needs to be removed. By the term "safe distance" is meant that an additional photolithography step may occur to remove the flux guide material 490 without harming any of the electronic lapping guide 200, the sensing element 330 and the front flux guide 350. As shown in FIG. 7B, the flux guide material 490 is no longer present at the electronic lapping guide site 205.

The electronic lapping guide 200 comprises a conductive material adapted to attach to two electrical leads for measuring a resistance through the conductive material. Standard leads may be added to the electronic lapping guide and can be made of a non-magnetic, electrically conductive material. For example, the non-magnetic, electrically conductive material may be copper, tantalum, gold or the like.

Figure 7A:
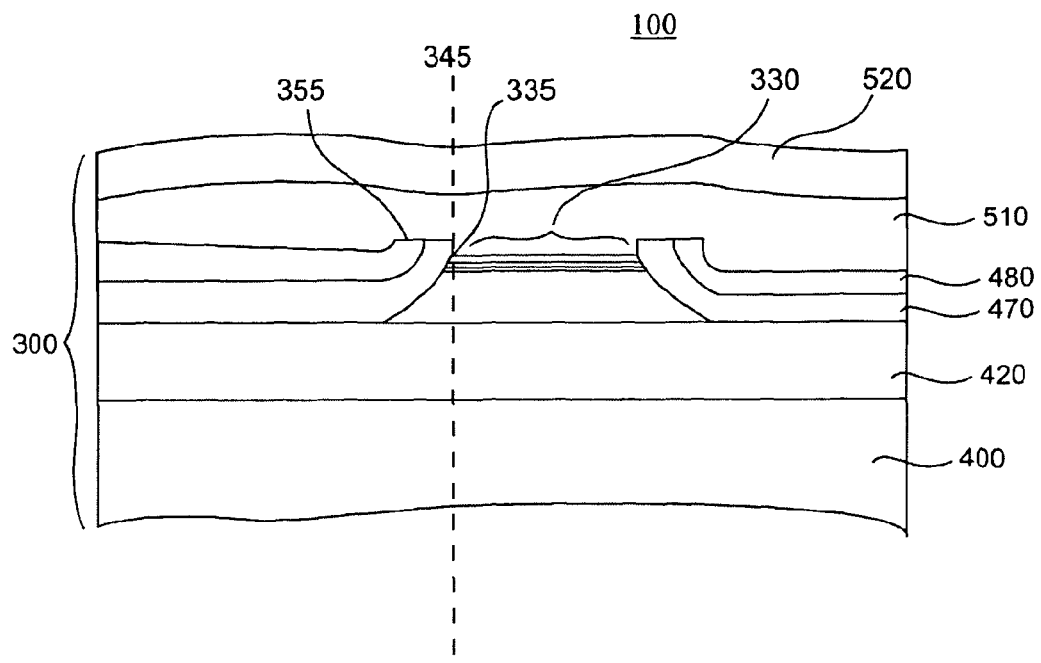
FIGS. 7A and 7B depict a cross-section view of a fabrication step for fabricating a sensing element of a magnetoresistive head assembly and an electronic lapping guide.
Figure 7B:
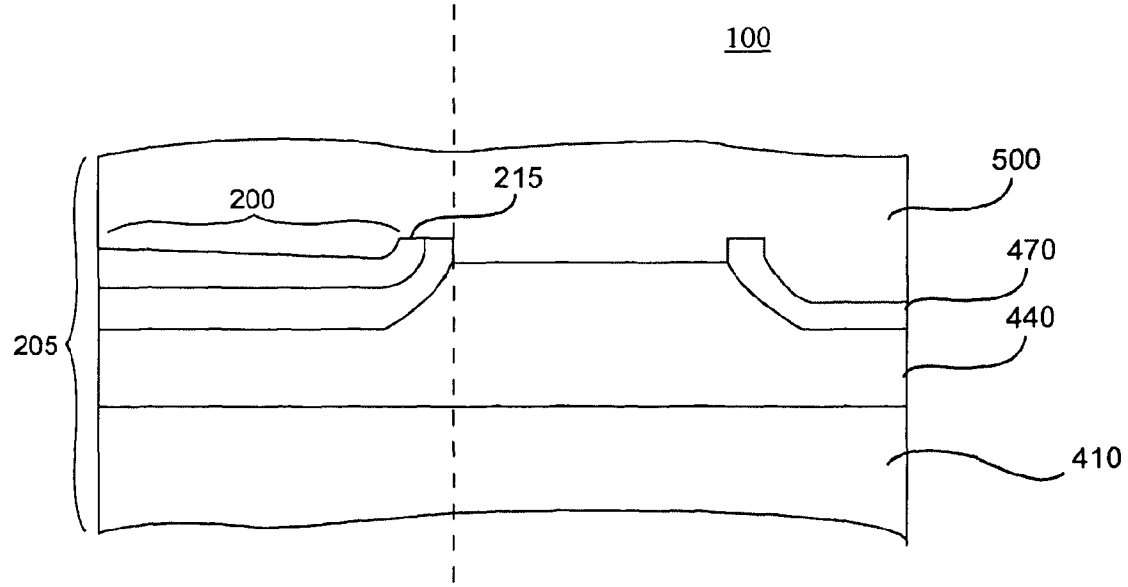

At 445 and as shown in FIGS. 7A and 7B, the electronic lapping guide 200 is then encapsulated by depositing an insulator 500 at the electronic lapping guide site 205. The fabrication of the sensing element 330 is completed by depositing a top lead 510 on the magnetoresistive head assembly 300. The top lead 510 may be an electrically conducting and mechanically hard material. For example, the top lead 510 may be tantalum, chromium, rhodium and the like. In certain aspects, the top lead 510 may be made of the same electrically conducting and mechanically hard material as in the metal gap layer 420 above.

After depositing the top lead 510 on the magnetoresistive head assembly 300, a second shield layer 520 may be deposited on the top lead layer 510. The second shield layer 520 may be formed of a soft ferromagnetic material. For example, the second shield layer 520 may be formed of nickel, nickel cobalt alloys, or nickel iron alloys and the like.

The back edge 215 of the resulting electron lapping guide 200 is self aligned to the back edge 335 of the front flux guide 350. By this method, the electronic lapping guide 200 and front flux guide 350 may be formed from the same material. For example, the back edge 215 of the fabricated electronic lapping guide 200 may be formed in the same photo and subtractive processes as the back edge 335 of the front flux guide 350, i.e., the back edge 215 of the electronic lapping guide 200 and the back edge 335 of the flux guide 350 are self-referenced to each other.

Magnetic head assemblies 300 and electronic lapping guides 200 are typically constructed as rows and columns on a wafer substrate 100. Each row may contain multiple read head assemblies and electronic lapping guides. After constructing the sensing element and the electronic lapping guides, the rows and columns of the sensing element and electronic lapping guides are diced into rows. After the row has been diced, it is necessary that the row be lapped until the air bearing surface 360 of each magnetoresistive head assembly 300 has been precisely formed.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. A method comprising:

depositing a first shield layer on a wafer substrate for a sensing structure comprising a sensing element;

depositing a first alumina layer on the wafer substrate at an electronic lapping guide site;

depositing a first metal gap layer on the wafer substrate including the first shield layer of the sensing structure and the first alumina layer at the electronic lapping guide site;

depositing a sensor material layer on the first metal gap layer to form the sensing structure;

removing the first metal gap layer and the sensor material layer from the electronic lapping guide site;

depositing a second alumina layer at the electronic lapping guide site;

patterning, by photolithography, the sensing element of the sensing structure, the sensing element comprising a sensing element front edge, and a front flux guide that comprises a front flux guide back edge, the sensing element front edge and the front flux guide back edge sharing a common interface that defines an interface plane normal to the surface of the wafer substrate, the front flux guide having a front flux guide length normal to the interface plane;

depositing a third alumina layer on the wafer substrate after the patterning of the sensing element;

depositing a flux guide material on the wafer substrate; and patterning, by photolithography, the flux guide material to produce the front flux guide and the electronic lapping guide, the electronic lapping guide positioned on the surface of the wafer substrate at the electronic lapping guide site, the electronic lapping guide comprising a conductive material adapted to attach to two electrical leads for measuring a resistance through the conductive material, the conductive material comprising a conductive material back edge aligned with the interface plane, the resistance of the conductive material being inversely proportional to a conductive material length normal to the interface plane.

2. The method of claim 1, further comprising:

lapping the wafer substrate in a lapping plane parallel to the interface plane to decrease the front flux guide length and the conductive material length.

3. The method of claim 1, further comprising:

measuring the resistance of the conductive material until the resistance reaches a calculated value associated with a desired stripe height of the sensing element.

4. The method of claim 1, wherein the sensing element comprises a spin valve sensor.

5. The method of claim 1, wherein the sensing element comprises a tunnel junction sensor.

6. The method of claim 1, wherein the electronic lapping guide and the front flux guide are formed from a same material.

7. The method of claim 1, wherein the electronic lapping guide and the sensing element are formed concurrently in a single photolithography step.

8. The method of claim 1, wherein the conductive material back edge of the electronic lapping guide is aligned to the front flux guide back edge.

9. The method of claim 1, wherein the conductive material back edge of the electronic lapping guide is aligned to the sensing element front edge.

10. The method of claim 1, further comprising: depositing leads for the electronic lapping guide on the wafer substrate.

* * * * *